United States Patent
Park et al.

(10) Patent No.: US 7,596,319 B2
(45) Date of Patent: Sep. 29, 2009

(54) WAVELENGTH DIVISION MULTIPLEXING-PASSIVE OPTICAL NETWORK SYSTEM

(75) Inventors: Soo Jin Park, Daejeon (KR); Kil Ho Song, Daejeon (KR)

(73) Assignee: KT Corporation (KR)

( * ) Notice: Subject to any disclaimer, the term of this patent is extended or adjusted under 35 U.S.C. 154(b) by 0 days.

(21) Appl. No.: 11/949,674

(22) Filed: Dec. 3, 2007

(65) Prior Publication Data

US 2008/0152345 A1 Jun. 26, 2008

Related U.S. Application Data

(63) Continuation of application No. PCT/KR2005/001676, filed on Jun. 3, 2005.

(51) Int. Cl.
 *H04J 14/00* (2006.01)
(52) U.S. Cl. .............................. 398/72; 398/63; 398/168
(58) Field of Classification Search .................. 398/63, 398/70, 71, 72, 90, 168
See application file for complete search history.

(56) References Cited

U.S. PATENT DOCUMENTS

| 5,550,666 | A | * | 8/1996 | Zirngibl ........................ 398/72 |
| 5,559,624 | A | | 9/1996 | Darcie et al. |
| 5,608,565 | A | * | 3/1997 | Suzuki et al. ................ 359/237 |
| 5,815,295 | A | * | 9/1998 | Darcie et al. ................... 398/72 |
| 5,912,749 | A | * | 6/1999 | Harstead et al. ................ 398/75 |
| 6,650,840 | B2 | * | 11/2003 | Feldman ........................ 398/21 |

FOREIGN PATENT DOCUMENTS

| JP | 08-107394 | A | 4/1996 |
| JP | 10-229385 | A | 8/1998 |
| JP | 2000-196536 | A | 7/2000 |
| JP | 2002-368699 | A | 12/2002 |
| JP | 2003-124893 | A | 4/2003 |
| JP | 2003-234721 | A | 8/2003 |
| JP | 2003-347668 | A | 12/2003 |
| KR | 2005-0040149 | | 3/2005 |

OTHER PUBLICATIONS

International Search Report Dated Feb. 20, 2006 in PCT Application No. PCT/ KR2005/001676, which is the parent application of this application—3 pages.
Written Opinion Dated Feb. 20, 2006 in PCT Application No. PCT/ KR2005/001676, which is the parent application of this application—3 pages.
Office Action of Corresponding Japanese Patent Application No. 2008-514535, Apr. 28, 2009, 5 pages.

* cited by examiner

*Primary Examiner*—Christina Y Leung
(74) *Attorney, Agent, or Firm*—Knobbe Martens Olson & Bear LLP

(57) ABSTRACT

A wavelength division multiplexing-passive optical network (WDM-PON) system includes a light source provider configured to wavelength-division-multiplex a laser light source of a wavelength allotted to each subscriber and optical-power-divide the multiplexed light source, a plurality of optical line terminals each configured to transmit a light source for upward signal with the power-divided light source and convert an upward optical signal into an electric signal, a plurality of optical network units each configured to convert the light source for upward signal into the upward optical signal, and a multiplexer/demultiplexer configured to separate the signal source for upward signal transmitted from the optical line termination in each subscriber or to multiplex the upward optical signal for each subscriber transmitted from the optical network unit so as to transmit the multiplexed signal into the optical line terminal.

18 Claims, 6 Drawing Sheets

US 7,596,319 B2

WAVELENGTH DIVISION MULTIPLEXING-PASSIVE OPTICAL NETWORK SYSTEM

CROSS-REFERENCE TO RELATED PATENT APPLICATIONS

This application is a continuation application under 35 U.S.C. § 365(c) of International Application No. PCT/KR2005/001676, filed Jun. 3, 2005 designating the United States. International Application No. PCT/KR2005/001676 was published in English as WO2006/129894 A1 on Dec. 7, 2006. This application incorporates herein by reference the International Application PCT/KR2005/001676 including the International Publication No. WO2006/129894 A1 in its entirety.

BACKGROUND

1. Field

The present disclosure generally relates to a wavelength division multiplexing-passive optical network (hereinafter, referred to as "WDM-PON") system, and more specifically, to a WDM-PON system configured to multiplex and divide laser lights having various wavelengths each having the same intensity in a central office to supply the laser lights to subscribers so that several subscribers share a light source having the same wavelength.

2. Discussion of the Related Technology

As the information society is moved into, people are keenly concerned to a WDM-PON configured to connect an optical line directly to a subscriber terminal so as to supply various wideband multimedia services to a plurality of subscribers. The WDM-PON refers to a network configured to connect an interval between an optical line terminal (hereinafter, referred to as "OLT") and an optical network unit (hereinafter, referred to as "ONU") with a passive optical device and to transmit optical signals having multiplexed letters/audio/video data into each ONU. The WDM-PON can provide information of large capacity to subscribers with excellent security and performance.

FIG. 1 is a diagram illustrating a WDM-PON system.

In the WDM-PON system of FIG. 1, when a central office provides a light source ($\Sigma\lambda_{is}$) of a predetermined intensity in different wavelengths for each subscriber, a WDM multiplexer/demultiplexer (hereinafter, referred to as "WDM MD") located in a remote node of a subscriber demultiplexes wavelengths of light sources in each subscriber and transmits the demultiplexed light source into the ONU. The light source $\lambda_{is}$ having the demultiplexed wavelength is modulated by projecting the light into a reflective optical amplifier of the ONU and amplifying or absorbing the light depending on input current of the optical amplifier. A modulated subscriber optical signal $\lambda_{im}$ is multiplexed in the WDM MD ($\Sigma\lambda_{im}$) and transmitted into the central office.

However, in the WDM-PON system, light sources having the same wavelength cannot be used by several subscribers since an optical signal (a downward optical signal) is used to generate a subscriber optical signal (upward optical signal) ($\lambda_{im}$). As a result, a light source between the central office and the ONU and a wavelength of optical signals are different in each subscriber, and a large amount of resources (wavelengths) is required to embody the above-described system in an optical subscriber network to admit a large number of subscribers, thereby requiring great cost.

The foregoing discussion in this section is to provide general background information, and does not constitute an admission of prior art.

SUMMARY

Various embodiments of the present invention is directed at providing a WDM-PON system configured to multiplex and optical-power-divide light sources with various wavelengths and to provide the multiplexed and divided light sources into subscribers so that several subscribers may share light source having the same wavelength.

According to an embodiment of the present invention, a wavelength division multiplexing-passive optical network system comprising: a light source provider configured to generate light sources for upward signals, to wavelength-division-multiplex the light sources and to optical-power-divide the multiplexed light source; a plurality of optical line terminals each configured to transmit the divided light source for upward signal into remote node and to convert upward optical signals which the light sources for upward signal are modulated into electric signals when the upward optical signal is received from the remote node; and a plurality of multiplexers/demultiplexers each configured to separate the light sources for upward signal from the optical line terminal in each wavelength and to transmit the separated light sources into optical network units, and to wavelength-division-multiplex the upward optical signals from the optical network units and to transmit the multiplexed upward optical signal into the optical line terminal.

DETAILED DESCRIPTION OF EMBODIMENTS

Various embodiments and features of the present invention will be described in detail with reference to the accompanying drawings.

Figure 1:
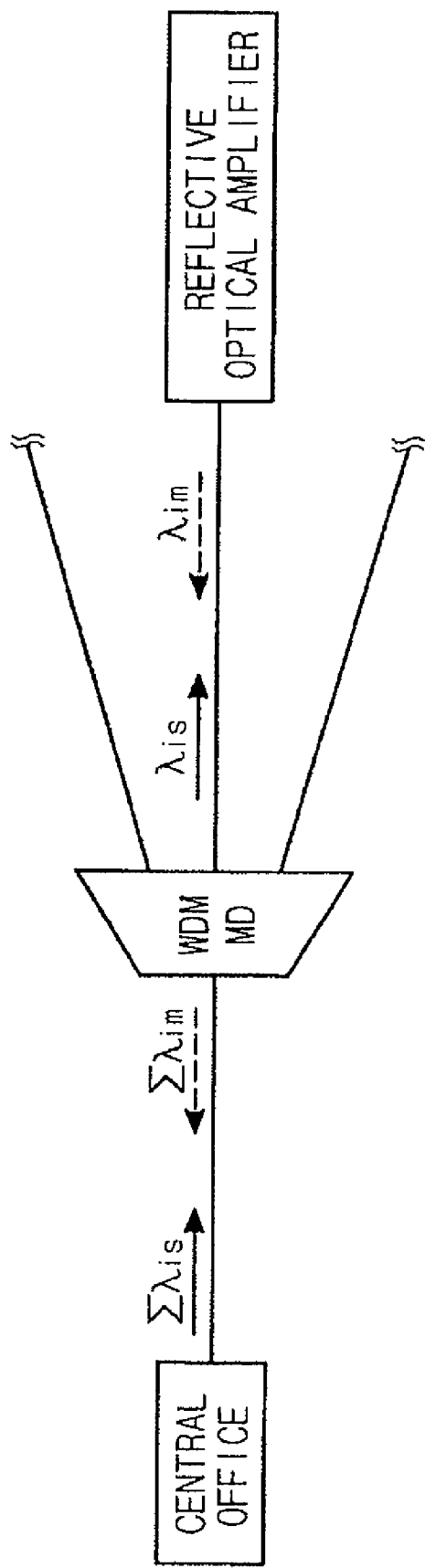
FIG. 1 is a diagram illustrating a WDM-PON system.
Figure 2:
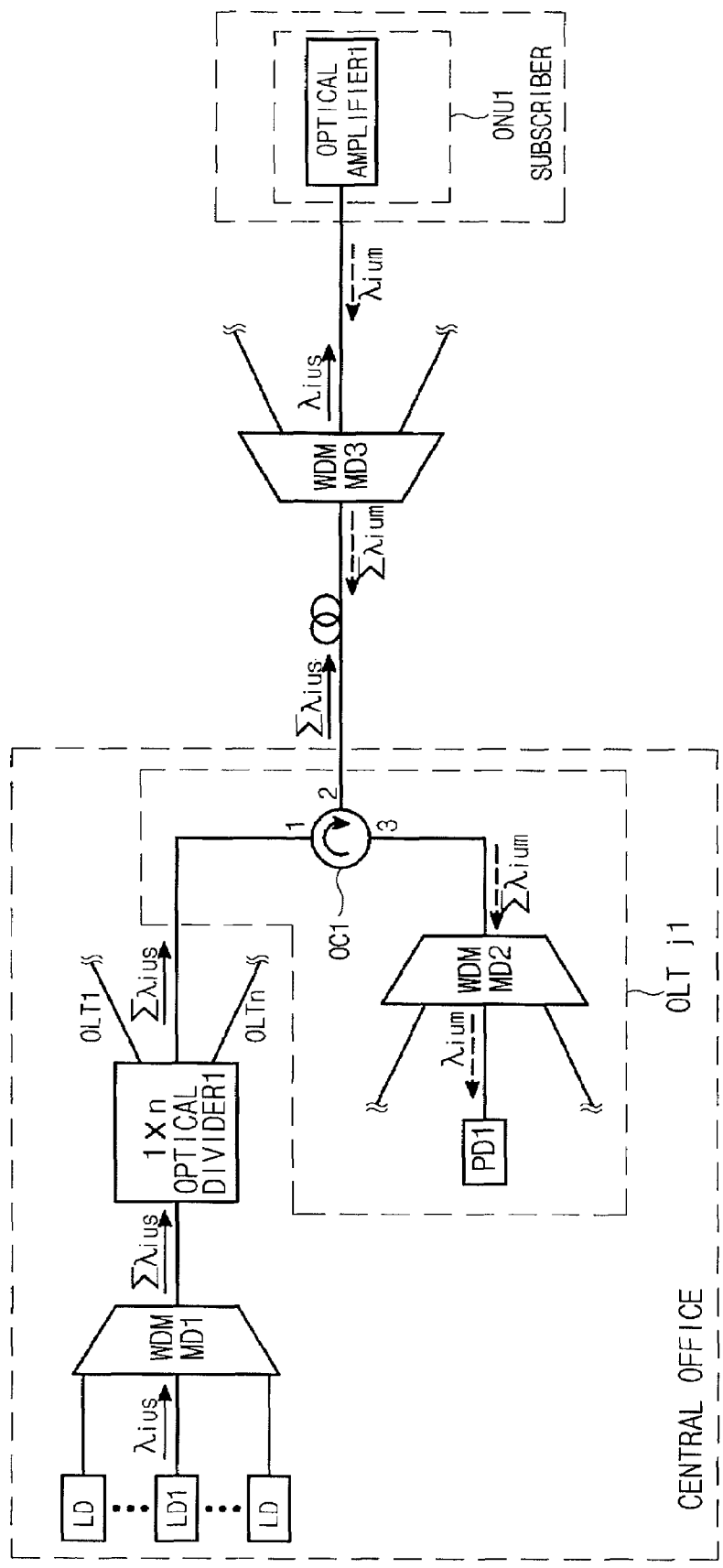
FIG. 2 is a diagram illustrating a first example according to an embodiment of the present invention.

In an embodiment, a WDM-PON system includes a laser diode (hereinafter, referred to as "LD"), a WDM MD, an optical divider, a photo diode (hereinafter, referred to as "PD"), an optical circulator and an optical amplifier. The WDM-PON system is explained based on the flow of signals. FIG. 2 is a diagram illustrating a first example according to an embodiment of the present invention.

According to the first example of the present invention, a WDM MD1 wavelength-division-multiplexes a light source $\lambda_{ius}$ corresponding to a wavelength of an i-subscriber supplied from a LD1 and light sources for the other subscribers. The light source is supplied from the single mode LD such as a DFB LD (Distributed FeedBack Laser Diode). The light source $\lambda_{ius}$ is used for an upward optical signal, which is a source light for generating the upward optical signal, to be transmitted from an ONU1 into a central office.

A light source $\Sigma\lambda_{ius}$ for upward signal which has been multiplexed in the WDM MD1 is light-power-divided in a 1×n optical divider 1, and then supplied into each of OLT1~OLTn. That is, each of OLT1~OLTn receive the same wavelength-division-multiplexed and divided light source. Herein, OLTj1 of the OLTs is exemplified.

The light source $\lambda_{ius}$ for upward signal of each subscriber supplied to the OLTj1 is transmitted into a WDM MD3 through an optical circulator OC1. The light source $\Sigma\lambda_{ius}$ for upward signal is demultiplexed in each subscriber in the WDM MD3, and the demultiplexed light source $\lambda_{ius}$ is transmitted into the ONU1 of the subscriber.

The light source $\lambda_{ius}$ for upward signal transmitted into the ONU1 is transmitted into an optical amplifier 1, and then modulated into an upward optical signal $\lambda_{ium}$ having the same wavelength as that of the light source $\lambda_{ius}$ for upward signal. The optical amplifier 1 is a reflection-type semiconductor optical amplifier.

Figure 3:
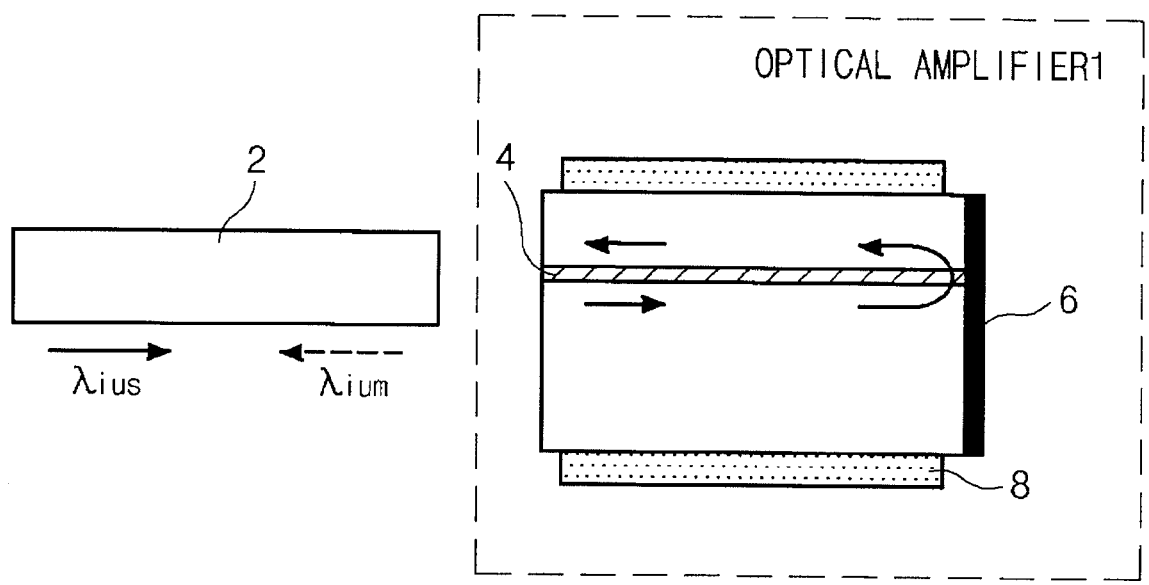
FIG. 3 is a diagram illustrating an optical amplifier according to an embodiment of the present invention.

FIG. 3 is a diagram illustrating the optical amplifier 1 according to an embodiment of the present invention.

The light source $\lambda_{ius}$ projected into an active wave guide path 4 of the optical amplifier 1 through an optical wave guide path 2 is reflected in a high-reflection coating film 6, and outputted into the optical wave guide path 2 through the active wave guide path 4. The light source $\lambda_{ius}$ is amplified depending on signal current (not shown) inputted into a substrate 8 while moving along the active wave guide path 4. That is, since the upward optical signal $\lambda_{ium}$ copies the signal current, the optical amplifier 1 converts an electric signal into the upward optical signal $\lambda_{ium}$ having the same wavelength as that of the light source $\lambda_{ius}$ for upward signal.

The upward optical signal $\lambda_{ium}$ generated from the optical amplifier 1 is transmitted into the WDM MD3 through an optical path where the light source $\lambda_{ius}$ for upward signal is transmitted, multiplexed with the upward optical signals of other subscribers by the WDM MD3, and then transmitted into the OLTj1 of the central office.

The multiplexed upward light signal $\Sigma\lambda_{ium}$ is inputted in a $2^{nd}$ port of the OC1, and outputted into a $3^{rd}$ port. The outputted upward light signal $\Sigma\lambda_{ium}$ is demultiplexed in the WDM MD2 in each subscriber, projected in the PD1, and then converted into an electric signal.

The above-described first example according to an embodiment of the present invention is characterized in that a single mode laser light source whose wavelength is allotted to each subscriber is multiplexed and divided so that the light source can be shared in several systems, and in that the wavelength of the optical signal transmitted from the ONU is determined by a light source supplied from the central office. The multiplexed light source $\Sigma\lambda_{ius}$ for upward signal is shared by a plurality of OLTs (OLT1~OLTn) so that different subscribers each connected to different OLTs may share light source having the same wavelength. As a result, although the number of subscribers is increased, an additional wavelengths are not required.

Figure 4:
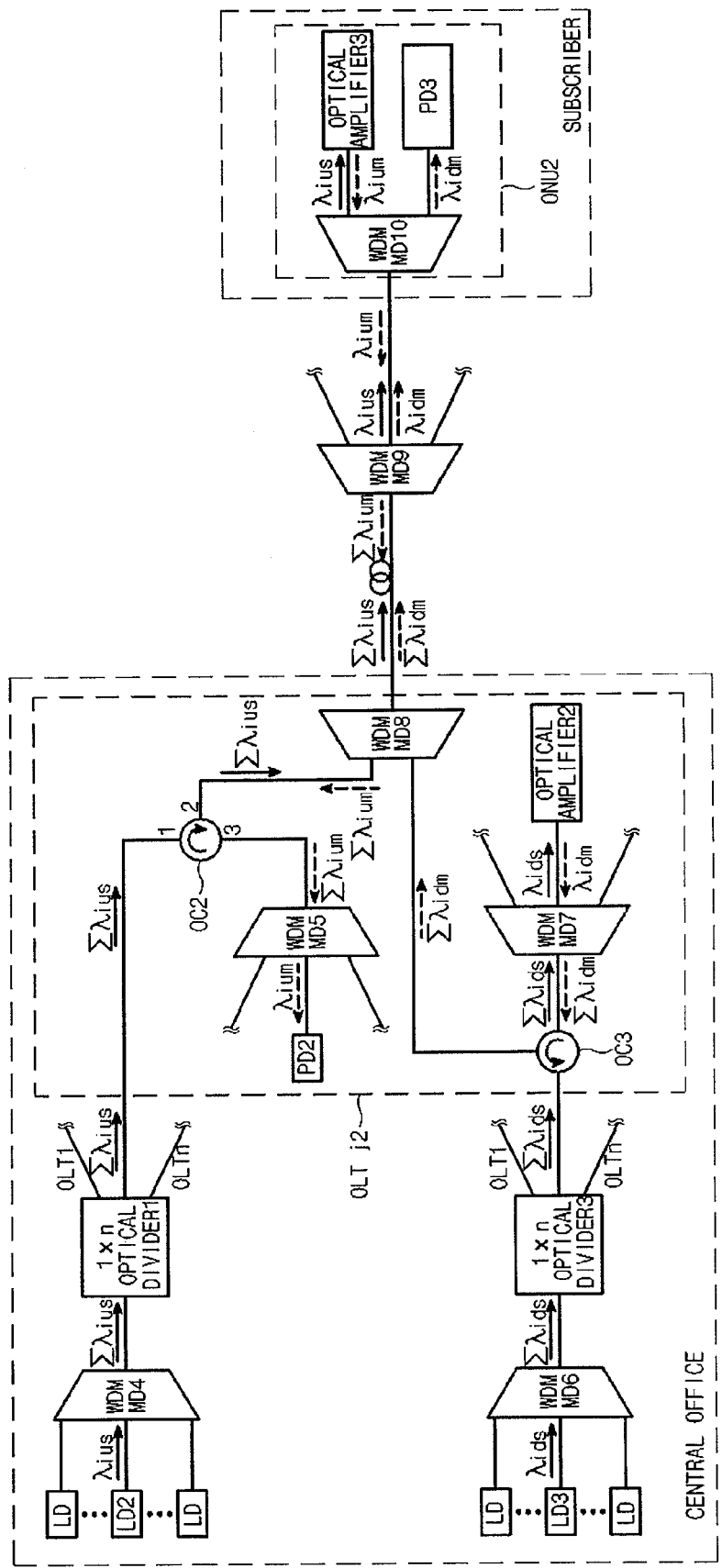
FIG. 4 is a diagram illustrating a second example according to an embodiment of the present invention.

FIG. 4 is a diagram illustrating a second example of the WDM-PON system according to an embodiment of the present invention. The system of FIG. 4 simultaneously transmits a downward optical signal from the central office into the ONU and an upward optical signal from the ONU into the central office.

In this embodiment, a WDM MD4 multiplexes the light source $\lambda_{ius}$ corresponding to a wavelength of an i-subscriber supplied from the LD2 and other light sources of other subscribers. The light source is supplied from the single mode LD such as the DFB LD, and the light source $\lambda_{ius}$ is a light source for upward signal transmitted from the ONU2 into the central office so as to generate an upward optical signal.

The light source $\Sigma\lambda_{ius}$ for upward signal, which is multiplexed in the WDM MD4 is light-power-divided in a 1×n optical divider 2, and supplied into each of OLT1~OLTn. Herein, OLTj2 of the OLI's is exemplified.

The light source $\Sigma\lambda_{ius}$ for upward signal of each subscriber supplied to the OLTj2 is projected into a WDM MD8 through an optical circulator OC2, and multiplexed with a downward optical signal $\Sigma\lambda_{idm}$. The WDM MD8 multiplexes the light source for upward signal and the downward optical signal.

The downward optical signal $\Sigma\lambda_{idm}$ and the multiplexed light source $\Sigma\lambda_{ius}$ for upward signal are transmitted into a WDM MD9 of a subscriber through an optical path. The light source $\Sigma\lambda_{ius}$ is demultiplexed in the WDM MD9 in each subscriber, and the demultiplexed light sources $\lambda_{ius}$ are transmitted into the ONU2 of the subscriber. Preferably, the light source $\lambda_{ius}$ for upward signal and a downward optical signal $\lambda_{idm}$ of the i-subscriber are outputted into the same output port.

The light source $\lambda_{ius}$ for upward signal transmitted into the ONU2 is separated form the downward optical signal $\lambda_{idm}$ by a WDM MD10, and transmitted into an optical amplifier 3. The optical amplifier 3 generates the upward optical signal $\lambda_{ium}$ as shown in FIG. 3.

The upward optical signal $\lambda_{ium}$ generated from the optical amplifier 3 is transmitted into the WDM MD9 through the WDM MD10, multiplexed with upward optical signals of other subscribers by the WDM MD9, and transmitted into the OLTj2 of the central office.

The multiplexed upward optical signal $\Sigma\lambda_{ium}$ is inputted into the $2^{nd}$ port of the optical circulator OC2 through the WDM MD8, and outputted into the $3^{rd}$ port. The upward optical signal $\Sigma\lambda_{ium}$ is demultiplexed in a WDM MD5 in each subscriber, and the demultiplexed upward optical signal $\lambda_{ium}$ is projected into the PD2, and converted into an electric signal.

In the second example according to an embodiment of the present invention, a light source $\lambda_{ids}$ for downward signal of an i-subscriber is multiplexed in a EM MD6 with light sources for downward signal of other subscribers. The multiplexed light source $\Sigma\lambda_{ids}$ for downward signal is light-power-divided in a 1×n optical divider 3, and transmitted into a WDM MD7 through an optical circulator OC3. The wavelength of the light source $\lambda_{ids}$ for downward signal is determined so that the light source $\lambda_{ius}$ for upward signal of the i-subscriber and the downward optical signal $\lambda_{idm}$ are demultiplexed into an output port.

The multiplexed light source $\Sigma\lambda_{ids}$ for downward signal is demultiplexed into the light source $\lambda_{ids}$ of the i-subscriber in the WDM MD7, and the demultiplexed light source $\lambda_{ids}$ is transmitted into the optical amplifier 2. As shown in FIG. 3, the optical amplifier 2 generates the downward optical signal $\lambda_{idm}$, and transmits it into the WDM MD7 which multiplexes the downward optical signal $\lambda_{idm}$ with downward optical signals of other subscribers.

The multiplexed downward light signal $\Sigma\lambda_{idm}$ is projected into a WDM MD8 through the optical circulator OC3, multiplexed with the light source $\Sigma\lambda_{ius}$ for upward signal, and transmitted into the WDM MD9 of the subscriber.

The VDM MD9 demultiplexes the downward optical signal $\Sigma\lambda_{idm}$ in each subscriber, and transmits the demultiplexed signal $\lambda_{idm}$ into the ONJ2 of the subscriber.

The downward optical signal $\lambda_{idm}$ transmitted into the ONU2 is separated from the light source $\lambda_{ius}$ for upward signal by a WDM MD10 in the ONU2, transmitted into a PD3, and converted into an electric signal.

As mentioned above, the second example is characterized in that the configuration for transmitting a light source for downward signal and a downward optical signal is further comprised in the first example having the configuration for the light source for upward signal and the upward optical signal.

Figure 5:
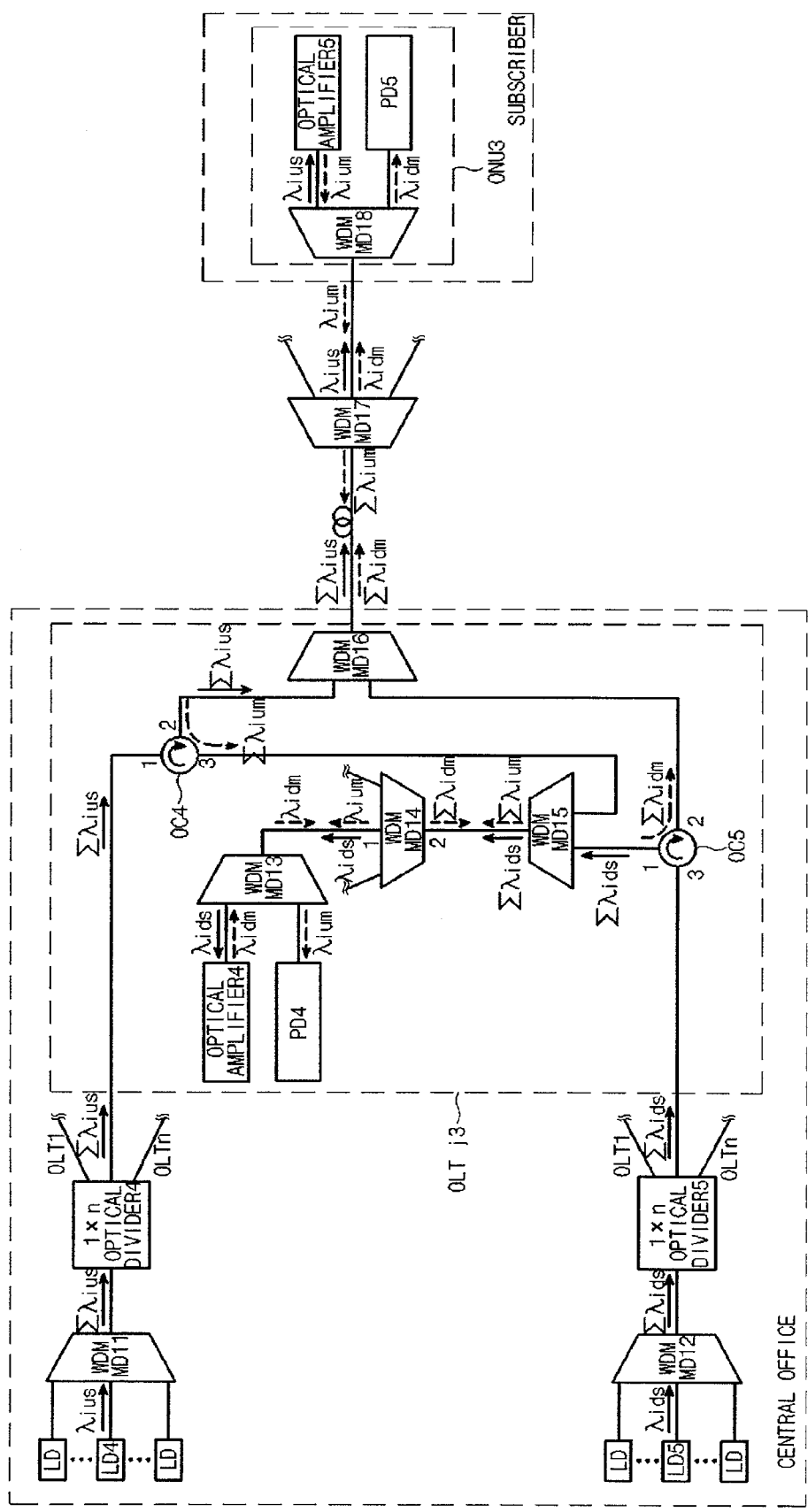
FIG. 5 is a diagram illustrating a third example according to an embodiment of the present invention.

While two WDM MDs (WMD MD5, WDM MD7) are used for multiplexing and demultiplexing of optical signals and light sources in each subscriber in the OLT in the second example, FIG. 5 is a diagram illustrating a third example according to an embodiment of the present invention where one WDM MD (WDM MD14) for multiplexing or demultiplexing of optical signals and light sources in each subscriber. In the third example, wavelengths of the light source for downward signal, the downward optical signal, the light source for upward signal and the upward optical signal are determined so that they may be separated into the same port to the same subscriber when they are separated in the WDM MD14 and the WDM MD17.

In the third example, a WDM MD11 multiplexes the light source $\lambda_{ius}$ corresponding to the wavelength of the i-subscriber supplied from a LD4 and other light sources of other subscribers. The light sources are supplied from the single mode LD such as a DFB LD. The light source $\lambda_{ius}$ is a light source for upward signal transmitted from an ONU3 into the central office.

The multiplexed light source $\Sigma\lambda_{ius}$ for upward signal in the WDM MD11 is light-power-divided in a 1×n optical divider 4, and supplied into each of OLT1~OLTn. Herein, OLTj3 of the OLTs is exemplified.

The light source $\Sigma\lambda_{ius}$ for upward signal of each subscriber supplied to the OLTj3 is projected into a WDM MD16 through an optical circulator OC3, and multiplexed with a downward optical signal $\Sigma\lambda_{idm}$. The WDM MD16 multiplexes the light source for upward signal and the downward optical signal.

The downward optical signal $\Sigma\lambda_{idm}$ and the multiplexed light source $\Sigma\lambda_{ius}$ for upward signal are transmitted into a WDM MD17 of a subscriber through an optical path. The light source $\Sigma\lambda_{ius}$ for upward signal is demultiplexed in the WDM MD17 in each subscriber, and the demultiplexed light source $\lambda_{ius}$ is transmitted into the ONU3 of the subscriber. Preferably, the light source $\lambda_{ius}$ for upward signal and a downward optical signal $\lambda_{idm}$ of the i-subscriber are outputted into the same output port.

The light source $\lambda_{ius}$ for upward signal transmitted into the ONU3 is separated form the downward optical signal $\lambda_{idm}$ by a WDM MD18, and transmitted into an optical amplifier 5. The optical amplifier 5 generates the upward optical signal $\lambda_{ium}$ as shown in FIG. 3.

The upward optical signal $\lambda_{ium}$ generated from the optical amplifier 5 is transmitted into the WDM MDI17 through the WDM MD18, multiplexed with upward optical signals of other subscribers by the WDM MD17, and transmitted into the OLTj3 of the central office.

The multiplexed upward optical signal $\Sigma\lambda_{ium}$ is inputted into the $2^{nd}$ port of the optical circulator OC4 through the WDM MD16 and outputted into the $3^{rd}$ port. The upward optical signal $\Sigma\lambda_{idm}$ is multiplexed with the light source $\Sigma\lambda_{ids}$ for downward signal in the WDM MD15, and transmitted into the $2^{nd}$ port of the WDM MD14.

The upward optical signal $\Sigma\lambda_{ium}$ and the light source $\Sigma\lambda_{ids}$ for downward signal are demultiplexed in each subscriber in the WDM MD14, and the upward optical signal $\lambda_{idm}$ and the light source $\lambda_{ids}$ for downward signal of the same subscriber are outputted into the same port ($1^{st}$ port). The outputted upward optical signal $\lambda_{ium}$ like the light source $\lambda_{ids}$ for downward signal in the WDM MD14 is separated from the light source $\lambda_{ids}$ in the WDM MD13, transmitted into a PD4, and converted into an electric signal.

In the third example according to an embodiment of the present invention, the light source $\lambda_{ids}$ for downward signal supplied from a LD5 is multiplexed in the WDM MD12 with other light sources for downward signal of other subscribers, light-power-divided in a 1×n optical divider 5, and transmitted into the WDM MD 15 through an optical circulator OC5.

The light source $\Sigma\lambda_{ids}$ for downward signal is multiplexed with the upward optical signal $\Sigma\lambda_{ium}$ by the WDM MD15, and then transmitted into the WDM MD14.

The WDM MD14 outputs the upward optical signal $\lambda_{ium}$ and the light source $\lambda_{ids}$ or downward signal in each subscriber into the same port ($1^{st}$ port). The light source $\lambda_{ids}$ for downward signal outputted with the upward optical signal $\lambda_{ium}$ in the WDM MD14 is separated from the upward optical signal $\lambda_{ium}$ in the WDM MD13, and transmitted into an optical amplifier 4. The optical amplifier 4 generates the downward optical signal $\lambda_{idm}$ as shown in FIG. 3.

The downward optical signal $\lambda_{idm}$ generated from the optical amplifier 4 is multiplexed with other downward optical signals of other subscribers in the WDM MD14, and transmitted into the WDM MD16 through the WDM MD15 and the optical circulator OC5.

The downward optical signal $\Sigma\lambda_{idm}$ transmitted into the WDM MD16 is multiplexed with the light source $\Sigma\lambda_{ius}$ for upward signal, and transmitted into the WDM MD17 of the subscriber through an optical path.

The WDM MD17 separates the downward optical signal $\Sigma\lambda_{idm}$ and the light source $\Sigma\lambda_{ius}$ for upward signal into the same port in each subscriber. The downward optical signal $\lambda_{idm}$ separated in each subscriber is transmitted into the ONU3 with the light source for upward signal, separated from the light source $\lambda_{ius}$ for upward signal in the WDM MD18, transmitted into a PD5, and converted into an electric signal.

In the third example, the WDM MD13, the WDM MD15, the WDM MD16 and the WDM MD17 multiplex or demultiplex the light source for downward signal or the downward optical signal with the light source for upward signal or the upward optical signal, and the WDM MD14 and the WDM MD17 multiplex or demultiplex light sources or optical signals in each subscriber.

Figure 6:
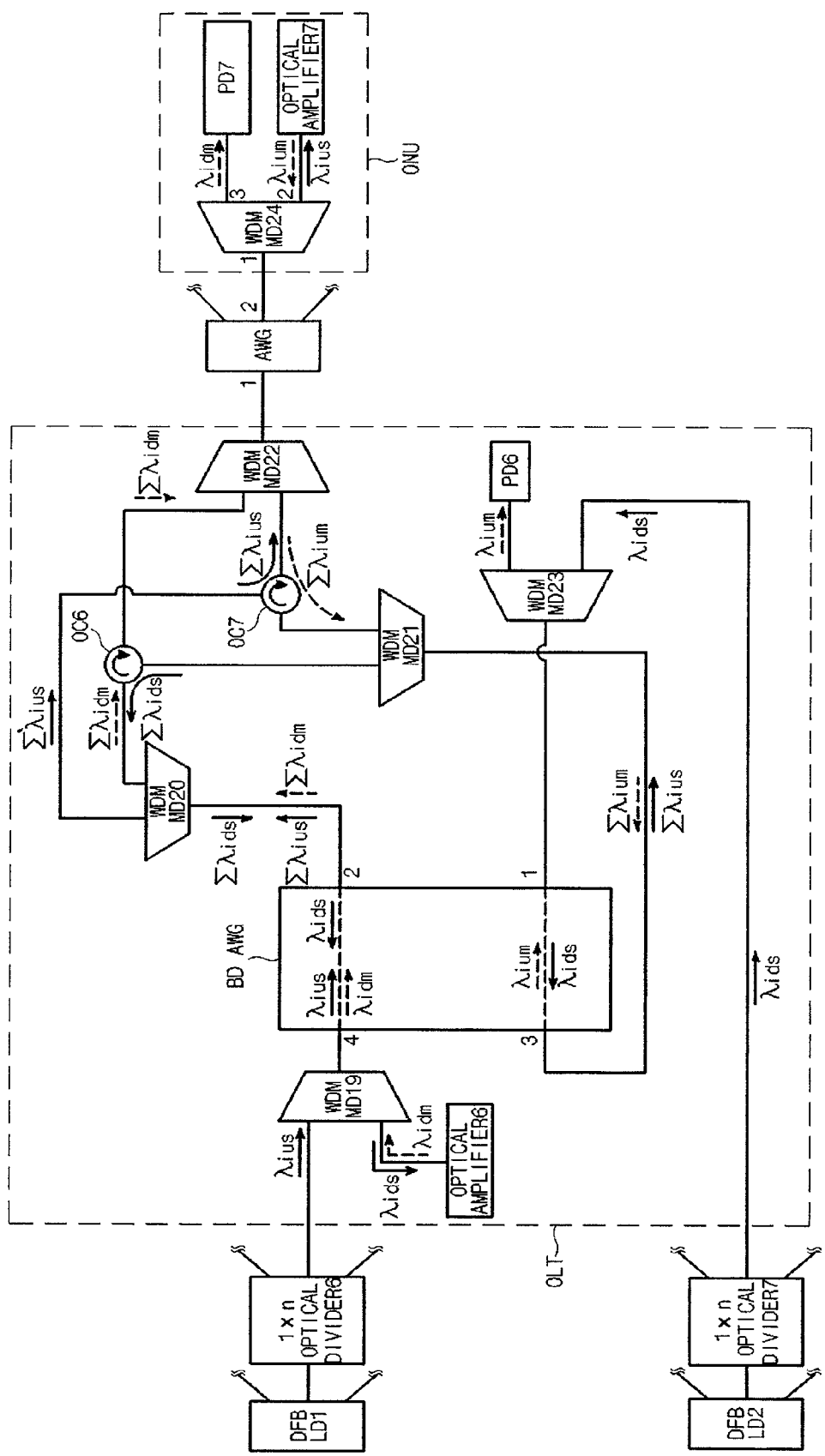
FIG. 6 is a diagram illustrating a fourth example according to an embodiment of the present invention.

FIG. 6 is a diagram illustrating a fourth example of the WDM-PON system according to an embodiment of the present invention.

In the fourth example, the light source $\lambda_{ius}$ for upward signal supplied from the central office into the ONU is light-power-divided in a 1×n optical divider 6 so that it may be shared in several systems. The DFB LD is used for the light source for upward signal as the single mode LD having a predetermined size.

The light source $\lambda_{ius}$ for upward signal for the i-subscriber which is light-power-divided into 1/n in the 1×n optical divider 6 is multiplexed with the downward optical signal $\lambda_{idm}$ in a WDM MD19, and transmitted into the i-th port ($4^{th}$ port) of bidirectional arrayed waveguide grating (hereinafter, referred to as "BD AWG"). The BD AWG, which is a kind of the WDM MD, multiplexes various wavelengths inputted into different port to output them into one port, or demultiplexes the multiplexed wavelengths inputted into one port to output them into each port.

The light source $\lambda_{ius}$ for upward signal transmitted into the BD AWG is multiplexed with light sources for upward signal of other subscribers.

The multiplexed light source $\Sigma\lambda_{ius}$ for upward signal is transmitted into a WDM MD20, separated from the downward optical signal $\Sigma\lambda_{idm}$ in the WDM MD20, and transmitted into a WDM MD 22 through an optical circulator OC7.

The light source $\Sigma\lambda_{ius}$ for upward signal transmitted into the WDM MD22 is transmitted into the AWG of the subscriber, and demultiplexed in each subscriber, and the demultiplexed light source $\lambda_{ius}$ is outputted into the $2^{nd}$ port and transmitted into the ONU.

The light source $\lambda_{ius}$ for upward signal transmitted into the ONU is inputted into the $1^{st}$ port of a WDM MD24 in the ONU so that it is separated from the downward optical signal $\lambda_{idm}$ and outputted into the $2^{nd}$ port. The light source $\lambda_{ius}$ for upward signal outputted into the $2^{nd}$ port of the WDM MD24 is transmitted into an optical amplifier 7, and converted into the upward optical signal $\lambda_{ium}$.

The upward optical signal $\lambda_{ium}$ is inputted into the $2^{nd}$ port of the BD AWG through the WDM MD24, multiplexed with other upward signals of other subscribers inputted into other ports, and outputted into the $1^{st}$ port.

The multiplexed upward optical signal $\Sigma\lambda_{ium}$ subscribers is transmitted into the OLT located at the central office, inputted into the $3^{rd}$ port of the BD AWG through the WDM MD22, the optical circulator OC7 and a WDM MD21 in the OLT, and demultiplexed into each wavelength of each subscriber, and the demultiplexed upward optical signal $\lambda_{ium}$ is outputted into the $1^{st}$ port as.

The upward optical signal $\lambda_{ium}$ outputted into the $1^{st}$ port of the BD AWG is transmitted into a PD6 through a WDM MD23, and converted into an electric signal in a PD6. The WDM MD23 multiplexes or demultiplexes the upward optical signal $\lambda_{ium}$ and the light source $\lambda_{ids}$ for downward signal.

The light source $\lambda_{ids}$ for downward signal supplied from the DFB LD2 is light-power-divided in a 1×n optical divider 7, and transmitted into the WDM MD23. The WDM MD23 multiplexes or demultiplexes the upward optical signal $\lambda_{ium}$ and the light source $\lambda_{ids}$ for downward signal.

The light source $\lambda_{ids}$ for downward signal outputted from the WDM MD23 is inputted into the $1^{st}$ port of the BD AWG, multiplexed with other light sources for downward signal of other subscribers inputted into other ports, and outputted into the $3^{rd}$ port.

The multiplexed light source $\Sigma\lambda_{ids}$ for downward signal is inputted into the $2^{nd}$ port of the BD AWG through the WDM MD21, an optical circulator OC6 and the WDM MD20, and demultiplexed into light sources for each subscriber, and the demultiplexed light source $\lambda_{ids}$ for downward signal is outputted into the $4^{th}$ port.

The light source $\lambda_{ids}$ for downward signal of each subscriber outputted into the $4^{th}$ port of the BD AWG is transmitted into the WDM MD19.

The light source $\lambda_{ids}$ for downward signal outputted from the WDM MD19 is converted into the downward optical signal $\lambda_{idm}$ in the power amplifier 6 as shown in FIG. 3.

The downward optical signal $\lambda_{idm}$ is projected into the WDM MD19, multiplexed with the light source $\lambda_{ius}$ for upward signal, inputted into the $4^{th}$ port of the BD AWG, multiplexed with other downward optical signals of other subscribers inputted into other ports, and outputted into the $2^{nd}$ port as $\Sigma\lambda_{idm}$.

The multiplexed downward optical signal $\Sigma\lambda_{idm}$ is demultiplexed from the light source $\Sigma\lambda_{ius}$ for upward signal by the WDM MD20, multiplexed with the light source $\Sigma\lambda_{ius}$ for upward signal in the WDM MD22 through the optical circulator OC6, transmitted into the BD AWG of the subscriber and demultiplexed in each subscriber, and the demultiplexed downward optical signal $\lambda_{idm}$ is outputted into the $2^{nd}$ port, and transmitted into the ONU.

The downward optical signal $\lambda_{idm}$ transmitted into the ONU is inputted into the $1^{st}$ port of the WDM MD24 in the ONU, separated from the light source $\lambda_{ius}$, and outputted into the $3^{rd}$ port. The downward optical signal $\lambda_{idm}$ outputted into the $3^{rd}$ port of the WDM MD24 is transmitted into a PD7, and converted into an electric signal.

In the above-described fourth example, the optical divider is comprised in the rear end of the DFB LD unlike the first through third examples where the WDM MD and the optical divider are sequentially comprised in the rear end of the DFB LD. AS a result, a light source whose wavelength is allotted for a specific subscriber is light-power-divided so that several subscribers may share a single laser.

As shown in the first through fourth examples, a single mode laser light source having a wavelength allotted to each subscriber is multiplexed by power-dividing the multiplexed light so that several systems may share it.

As described above, according to an embodiment of the present invention, a single mode laser light source having a wavelength allotted to each subscriber, and light-power-divided so that several systems may share the light source, thereby reducing resources and cost required for constitution of the system.

Moreover, a wavelength of an optical signal transmitted from an ONU is determined by a light source supplied from a central office so that it is not necessary to administrate the wavelength in the ONU.

What is claimed is:

1. A wavelength division multiplexing-passive optical network system comprising:
   a light source provider configured:
      to generate light sources for upward signals,
      to wavelength-division-multiplex the light sources, and
      to optical-power-divide the multiplexed light source;
   a plurality of multiplexer/demultiplexer elements remotely located from the light source provider; and
   a plurality of optical line terminals each configured:
      to transmit the divided light source to a corresponding one of the plurality of multiplexer/demultiplexer elements,
      to receive, from the corresponding multiplexer/demultiplexer element, upward optical signals modulated using the light source, and
      to convert the upward optical signals into electric signals,
   wherein each of the multiplexer/demultiplexer elements is configured:
      to separate the light sources from a corresponding one of the plurality of optical line terminals into each wavelength component,
      to transmit the separated light sources to optical network units,
      to wavelength-division-multiplex the upward optical signals from the optical network units, and
      to transmit the multiplexed upward optical signal to the corresponding optical line terminal.

2. The system according to claim 1, wherein the light source provider comprises:
   a plurality of laser diodes each configured to supply the light source for upward signal;
   a multiplexer configured to wavelength-division-multiplex the light sources supplied from the plurality of laser diodes; and
   a light dividing unit configured to optical-power-divide the multiplexed light source so as to transmit the divided light sources to the plurality of optical line terminals, respectively.

3. The system according to claim 2, wherein each of the optical line terminals comprises:
a demultiplexer configured to demultiplex the multiplexed upward optical signal into each wavelength component;
a plurality of photo diodes each configured to convert the upward optical signal demultiplexed in the demultiplexer into the electric signal; and
an optical circulator configured:
to transmit the light source optical-power-divided in the light source provider to the corresponding multiplexer/demultiplexer element, and
to transmit the multiplexed upward optical signal received from the corresponding multiplexer/demultiplexer element to the demultiplexer.

4. The system according to claim 1, wherein each of the optical line terminals comprises:
a demultiplexer configured to demultiplex the multiplexed upward optical signal into each wavelength component;
a plurality of photo diodes each configured to convert the upward optical signal demultiplexed in the demultiplexer into the electric signal; and
an optical circulator configured:
to transmit the light source optical-power-divided in the light source provider to the corresponding multiplexer/demultiplexer element, and
to transmit the multiplexed upward optical signal received from the corresponding multiplexer/demultiplexer element to the demultiplexer.

5. The system according to claim 1, wherein the upward optical signal has the same wavelength as that of the corresponding light source for upward signal.

6. A wavelength division multiplexing-passive optical network system comprising:
a $1^{st}$ light source provider configured:
to generate light sources for upward signal,
to wavelength-division-multiplex the light sources for upward signal, and
to optical-power-divide the multiplexed light source for upward signal;
a $2^{nd}$ light source provider configured:
to generate light sources for downward signal,
to wavelength-division-multiplex the light sources for downward signal and to optical-power-divide the multiplexed light source for downward signal;
a plurality of multiplexer/demultiplexer elements remotely located from the first light source provider; and
a plurality of optical line terminals each configured:
to transmit the light source from the $1^{st}$ light source provider to a corresponding one of the plurality of $1^{st}$ multiplexer/demultiplexer elements,
to receive, from the corresponding $1^{st}$ multiplexer/demultiplexer element, upward optical signals modulated using the light source for upward signal, and
to convert the upward optical signals into electric signals,
to modulate the light sources for downward signal from the $2^{nd}$ light source provider into downward optical signals, and
to transmit the downward optical signals to the corresponding $1^{st}$ multiplexer/demultiplexer element,
wherein each of the plurality of $1^{st}$ multiplexer/demultiplexer elements is configured:
to separate the light source for upward signal and the downward optical signal from a corresponding one of the plurality of optical line terminals into each wavelength component, and
to transmit the separated light sources and downward optical signals to optical network units,
to wavelength-division-multiplex the upward optical signals from the optical network units, and
to transmit the multiplexed signal to the corresponding optical line terminal.

7. The system according to claim 6, wherein each of the optical line terminals is configured:
to separate the light source received from the $2^{nd}$ light source provider into each wavelength component,
to modulates the separated light sources to generate the downward optical signals,
to wavelength-division-multiplexes the downward optical signals, and
to transmits the multiplexed downward optical signals to the corresponding $1^{st}$ multiplexer/demultiplexer element.

8. The system according to claim 7, wherein each of the optical line terminals comprises:
a $4^{th}$ multiplexer/demultiplexer element configured:
to wavelength-division-multiplex the upward optical signals from the corresponding $1^{st}$ multiplexer/demultiplexer element and the light source from the $2^{nd}$ light source provider, and
to transmit the modulated and multiplexed downward optical signal into the corresponding $1^{st}$ multiplexer/demultiplexer element;
a $5^{th}$ multiplexer/demultiplexer element configured:
to separate the upward optical signal and the light source for downward signal multiplexed in the $4^{th}$ multiplexer/demultiplexer element into each wavelength component, and
to transmit the modulated and multiplexed downward optical signal into the $4^{th}$ multiplexer/demultiplexer element;
a plurality of $2^{nd}$ optical amplifiers each configured to modulate the light source for downward signal separated in the $5^{th}$ multiplexer/demultiplexer element so as to generate the downward optical signal;
a plurality of $2^{nd}$ photodiodes each configured to convert the upward optical signal separated in the $5^{th}$ multiplexer/demultiplexer element into electric signal;
a $3^{rd}$ optical circulator configured:
to transmit the light source received from the $2^{nd}$ light source provider to the $4^{th}$ multiplexer/demultiplexer element, and
to transmit the downward optical signal received from the $4^{th}$ multiplexer/demultiplexer element to the corresponding $1^{st}$ multiplexer/demultiplexer element; and
a $4^{th}$ optical circulator configured:
to transmit the light source for upward signal received from the $1^{st}$ light source provider to the corresponding $1^{st}$ multiplexer/demultiplexer element, and
to transmit the upward optical signal received from the corresponding $1^{st}$ multiplexer/demultiplexer element to the $4^{th}$ multiplexer/demultiplexer element.

9. The system according to claim 8, wherein each of the optical line terminals further comprises a $6^{th}$ multiplexer/demultiplexer configured:
to wavelength-division-multiplex the downward optical signal from the $3^{rd}$ optical circulator and the light source received from the $4^{th}$ optical circulator so as to transmit the multiplexed signal and source into the corresponding $1^{st}$ multiplexer/demultiplexer element, and to transmit the upward optical signal received from the corresponding 1$^{st}$ multiplexer/demultiplexer element to the 4$^{th}$ optical circulator.

10. The system according to claim 6, wherein each of the optical line terminals comprises:
   a demultiplexer configured to demultiplex the multiplexed upward optical signal into each wavelength component;
   a plurality of 1$^{st}$ photo diodes each configured to convert the upward optical signal demultiplexed in the demultiplexer into electric signals;
   a 1$^{st}$ optical circulator configured:
      to transmit the light source divided in the 1$^{st}$ light source provider into the corresponding 1$^{st}$ multiplexer/demultiplexer element, and
      to transmit the multiplexed upward optical signal received from the corresponding 1$^{st}$ multiplexer/demultiplexer element to the demultiplexer;
   a plurality of 1$^{st}$ optical amplifiers each configured to modulate the light source for downward signal so as to generate the downward optical signal;
   a 2$^{nd}$ multiplexer/demultiplexer element configured:
      to separate the light source for downward signal from the 2$^{nd}$ light source provider into each wavelength so as to transmit the separated light sources to the plurality of 1$^{st}$ optical amplifiers, and
      to wavelength-division-multiplex the downward optical signals modulated in the plurality of 1$^{st}$ optical amplifiers; and
   a 2$^{nd}$ optical circulator configured:
      to transmit the light source received from the 2$^{nd}$ light source provider to the 2$^{nd}$ multiplexer/demultiplexer element, and
      to transmit the downward optical signal multiplexed in the 2$^{nd}$ multiplexer/demultiplexer element to the corresponding 1$^{st}$ multiplexer/demultiplexer element.

11. The system according to claim 10, wherein each of the optical line terminals further comprises:
   a 3$^{rd}$ multiplexer/demultiplexer element configured:
      to wavelength-division-multiplex the light source from the 1$^{st}$ optical circulator and the downward optical signal from the 2$^{nd}$ optical circulator so as to transmit the multiplexed light source and signal to the corresponding 1$^{st}$ multiplexer/demultiplexer element, and
      to transmit the upward optical signal received from the corresponding 1$^{st}$ multiplexer/demultiplexer element to the 1$^{st}$ optical circulator.

12. A wavelength division multiplexing-passive optical network system comprising:
   a plurality of 1$^{st}$ light source providers each configured:
      to generate light source for upward signal, and
      to optical-power-divide the light source;
   a plurality of 2$^{nd}$ light source providers each configured:
      to generate light source for downward signal, and
      to optical-power-divide the light source;
   a plurality of 1$^{st}$ multiplexer/demultiplexer elements; and
   a plurality of optical line terminals each configured:
      to wavelength-division-multiplex the light sources received from the 1$^{st}$ light source providers so as to transmit the multiplexed light source to a corresponding one of the plurality of 1$^{st}$ multiplexer/demultiplexer elements, and
      to receive, from the corresponding 1$^{st}$ multiplexer/demultiplexer element, upward optical signals modulated using the light source for upward signal,
      to convert the upward optical signals into electric signals, and
      to modulate the light sources received from the 2$^{nd}$ light source providers into downward optical signals so as to transmit the downward optical signals to the corresponding 1$^{st}$ multiplexer/demultiplexer element,
   wherein each of the plurality of 1$^{st}$ multiplexer/demultiplexer elements is configured:
      to separate the light source for upward signal and the downward optical signal from a corresponding one of the plurality of optical line terminals into each wavelength component, and
      to transmit the separated light sources and downward optical signals to optical network units,
      to wavelength-division-multiplex the upward optical signals from the optical network units, and
      to transmit the multiplexed signal to the corresponding optical line terminal.

13. The system according to claim 12, wherein each of the 1$^{st}$ light source provider and the 2$^{nd}$ light source provider comprises:
   a laser diode configured to generate a laser light source having a given power; and
   a light divider configured:
      to light-power-divide the light source from the laser diode, and
      to transmit the divided light source to the plurality of optical line terminals, respectively.

14. The system according to claim 13, wherein each of the optical line terminals comprises:
   a plurality of optical amplifiers each configured to generate the downward optical signal by modulating light source for downward signal;
   a plurality of photodiodes each configured to convert the upward optical signal into electric signal;
   a 2$^{nd}$ multiplexer/demultiplexer element configured:
      to wavelength-division-multiplex the light source received from the plurality of 1$^{st}$ light source provider and the downward optical signals modulated in the plurality of optical amplifiers,
      to separate the multiplexed upward optical signal from the corresponding 1$^{st}$ multiplexer/demultiplexer element into each wavelength component so as to transmit the separated signals to the plurality of photodiodes, and
      to wavelength-division-multiplex and demultiplex the light source received from the plurality of 2$^{nd}$ light source providers so as to transmit the light sources for downward signal to the plurality of optical amplifiers;
   a 3$^{rd}$ multiplexer/demultiplexer element configured:
      to demultiplex the light source for upward signal and the downward optical signal multiplexed in the 2$^{nd}$ multiplexer/demultiplexer element, and
      to transmit the light source for downward signal multiplexed in the 2$^{nd}$ multiplexer/demultiplexer element to the 2$^{nd}$ multiplexer/demultiplexer element;
   a 1$^{st}$ optical circulator configured:
      to transmit the downward optical signals demultiplexed in the 3$^{rd}$ multiplexer/demultiplexer to the corresponding 1$^{st}$ multiplexer/demultiplexer element, and
      to transmit the light source for downward signal multiplexed in the 2$^{nd}$ multiplexer/demultiplexer to the 3$^{rd}$ multiplexer/demultiplexer element; and
   a 2$^{nd}$ optical circulator configured:
      to transmit the light source for upward signal demultiplexed in the 3$^{rd}$ multiplexer/demultiplexer element into the corresponding 1$^{st}$ multiplexer/demultiplexer element, and to transmit the upward optical signal received from the corresponding 1$^{st}$ multiplexer/demultiplexer element into the 2$^{nd}$ multiplexer/demultiplexer element.

15. The system according to claim 14, wherein each of the optical line terminals further comprises:

a 4$^{th}$ multiplexer/demultiplexer configured:

to wavelength-division-multiplex the downward optical signal from the 1$^{st}$ optical circulator and light source for upward signal from the 2$^{nd}$ optical circulator so as to transmit the multiplexed signal and light source to the corresponding 1$^{st}$ multiplexer/demultiplexer element, and to transmit the upward optical signal received from the corresponding 1$^{st}$ multiplexer/demultiplexer element to the 2$^{nd}$ optical circulator.

16. The system according to claim 14, wherein the 2$^{nd}$ multiplexer/demultiplexer element is a bilateral waveguide-type grating.

17. The system according to claim 13, wherein each of the optical line terminals comprises:

a plurality of optical amplifiers each configured to generate the downward optical signal by modulating light source for downward signal;

a plurality of photodiodes each configured to convert the upward optical signal into electric signal;

a 2$^{nd}$ multiplexer/demultiplexer configured:

to wavelength-division-multiplex the light source received from the plurality of 1$^{st}$ light source provider and the downward optical signals modulated in the plurality of optical amplifiers, to separate the multiplexed upward optical signal received from the corresponding 1$^{st}$ multiplexer/demultiplexer element into each wavelength component so as to transmit the separated signals to the plurality of photodiodes, and to wavelength-division-multiplex and demultiplex the light source received from the plurality of 2$^{nd}$ light source providers so as to transmit the light sources for downward signal to the plurality of optical amplifiers;

a 3$^{rd}$ multiplexer/demultiplexer element configured:

to demultiplex the light source for upward signal and the downward optical signal multiplexed in the 2$^{nd}$ multiplexer/demultiplexer element, and to transmit the light source for downward signal multiplexed in the 2$^{nd}$ multiplexer/demultiplexer element to the 2$^{nd}$ multiplexer/demultiplexer element;

a 1$^{st}$ optical circulator configured:

to transmit the downward optical signals demultiplexed in the 3$^{rd}$ multiplexer/demultiplexer element to the corresponding 1$^{st}$ multiplexer/demultiplexer element, and to transmit the light source for downward signal multiplexed in the 2$^{nd}$ multiplexer/demultiplexer element to the 3$^{rd}$ multiplexer/demultiplexer; and a 2$^{nd}$ optical circulator configured:

to transmit the light source for upward signal demultiplexed in the 3$^{rd}$ multiplexer/demultiplexer element into the corresponding 1$^{st}$ multiplexer/demultiplexer element, and to transmit the upward optical signal from the corresponding 1$^{st}$ multiplexer/demultiplexer element into the 2$^{nd}$ multiplexer/demultiplexer element.

18. The system according to claim 12, wherein each of the 1$^{st}$ multiplexer/demultiplexer elements is a waveguide-type grating.

* * * * *